(12) United States Patent
Weingarten et al.

(10) Patent No.: US 6,826,219 B2
(45) Date of Patent: Nov. 30, 2004

(54) SEMICONDUCTOR SATURABLE ABSORBER DEVICE, AND LASER

(75) Inventors: Kurt Weingarten, Zürich (CH); Gabriel J. Spuehler, Zürich (CH); Ursula Keller, Zürich (CH); David Stephen Thomas, Dietikon (CH)

(73) Assignee: Gigatera AG, Dietikon (CH)

( * ) Notice: Subject to any disclaimer, the term of this patent is extended or adjusted under 35 U.S.C. 154(b) by 0 days.

(21) Appl. No.: 10/097,500

(22) Filed: Mar. 14, 2002

(65) Prior Publication Data

US 2003/0174741 A1 Sep. 18, 2003

(51) Int. Cl.⁷ ................................................ H01S 5/00
(52) U.S. Cl. ........................................... 372/49; 372/45
(58) Field of Search ....................... 372/46, 45, 43–50, 372/18, 54, 75

(56) References Cited

U.S. PATENT DOCUMENTS

| | | | | |
|---|---|---|---|---|
| 4,441,789 A | * | 4/1984 | Pohlack | 359/588 |
| 5,229,627 A | * | 7/1993 | Kosaka | 257/85 |
| 5,237,577 A | * | 8/1993 | Keller et al. | 372/11 |
| 5,278,855 A | * | 1/1994 | Jacobovitz-Veselka et al. | 372/44 |
| 5,345,454 A | * | 9/1994 | Keller | 372/12 |
| 5,351,256 A | * | 9/1994 | Schneider et al. | 372/45 |
| 5,627,854 A | * | 5/1997 | Knox | 372/99 |
| 5,701,327 A | * | 12/1997 | Cunningham et al. | 372/99 |
| 5,987,049 A | * | 11/1999 | Weingarten et al. | 372/70 |
| 6,028,693 A | * | 2/2000 | Fork et al. | 359/248 |
| 6,141,359 A | * | 10/2000 | Cunningham et al. | 372/18 |
| 6,393,035 B1 | * | 5/2002 | Weingarten et al. | 372/18 |
| 6,538,298 B1 | * | 3/2003 | Weingarten et al. | 257/436 |
| 6,560,268 B1 | * | 5/2003 | Deichsel et al. | 372/99 |

\* cited by examiner

*Primary Examiner*—Paul Ip
*Assistant Examiner*—Tuan N. Nguyen
(74) *Attorney, Agent, or Firm*—Rankin, Hill, Porter & Clark LLP

(57) ABSTRACT

According to the invention, a semiconductor saturable absorber mirror device for reflecting at least a proportion of electromagnetic radiation of essentially one given optical frequency impinging on said device, comprises a substrate with a Bragg reflector, and on top of this Bragg reflector a layered structure with at least one layer with saturably absorbing semiconductor material. A low index dielectric coating layer is placed on said outermost surface of said structure. The Bragg reflector and said layered structure are designed in a manner that the field intensity of radiation of said given frequency takes up a maximum at or near the interface between said structure and said dielectric material. The thickness of said dielectric coating layer may be varied and may for example be a quarter of a wavelength of said electromagnetic radiation in the dielectric material.

29 Claims, 10 Drawing Sheets

SEMICONDUCTOR SATURABLE ABSORBER DEVICE, AND LASER

FIELD OF THE INVENTION

This invention relates to a semiconductor device and, more particularly, to a semiconductor saturable absorber device for use in mode-locked lasers for the generation of short and ultrashort optical pulses. The invention also relates to a mode-locked laser comprising a semiconductor saturable absorber device.

BACKGROUND OF THE INVENTION

Lasers emitting short or ultrashort pulses—i.e. pulses in the picosecond and in the sub-picosecond range—are known in the art. A well-known technique for short or ultrashort pulse generation is mode locking. Mode locking is a coherent superposition of longitudinal laser-cavity modes, It is forced by a temporal loss modulation which reduces the intracavity losses for a pulse within each cavity-roundtrip time. This results in an open net gain window, in which pulses only experience gain if they pass the modulator at a given time. The loss modulation can be formed either actively or passively. Active mode locking is achieved, for instance, using an acousto-optic modulator as an intracavity element, which is synchronized to the cavity-roundtrip time. However, for ultra-short-pulse generation, passive mode-locking techniques are preferred, because only a passive shutter is fast enough to shape and stabilize ultrashort pulses. One option to implement passive mode locking is to rely on a saturable absorber mechanism, which produces decreasing loss with increasing optical intensity. When the saturable-absorber parameters are correctly adjusted for the laser system, stable and self-starting mode locking is obtained.

A broad class of semiconductor saturable absorbers are known in the state of the art. Such saturable absorbers usually comprise a layered structure with one or several layers of a semiconductor material having a non-linear absorption characteristics at the laser frequency. By choosing appropriate layers with specifically prepared surfaces, a large variety of different optical properties can be achieved for such structures. Especially, these structures may be designed to be anti-resonant or resonant, and they may have a high Q-factor or a low Q-factor. For mode-locking in lasers, antiresonant devices have been the structures of choice. This is because resonant structures have much narrower tolerances of growth accuracy and the high field intensities in the structures lead to high losses and a delicate dependence of the characteristics of the entire laser system on the absorber device properties such as its quality etc. of the structure. Known structures of this kind include the antiresonant Fabry-Perot Saturable Absorbers (A-FPSAs), and conventional semiconductor saturable absorber devices (cf. U. Keller et al., "Semiconductor saturable absorber mirrors for femtosecond to nanosecond pulse generation in solid-state lasers", Journal of Selected Topics in Quantum Electronics (JSTQE), Vol. 2, No. 3, 435–453, 1996, incorporated herein by reference) being low Q antiresonant devices. Further examples of structures include the Saturable Bragg Reflector (SBR). Recently, a low-field enhancement (i.e. low Q) but resonant saturable absorber device (LOFERS) design has been invented. A corresponding U.S. patent application by Weingarten, Spühler, Keller, and Krainer is pending and has been attributed application Ser. No. 10/016,530.

Jung et. Al. have disclosed a "thin-absorber" device for operating around 840 nm which uses a layer of dielectric to complete the semiconductor structure. This layer is described as an effective "anti-reflection" (AR) coating. (Electronics Letters Feb. 1995, pp. 288–289).

For many applications, InGaAs is a preferred absorber material due to its inherent properties. This, however, brings about new challenges when applied to lasers designed for communication technology purposes. In communication technology, lasers operating at frequencies corresponding to a free space wavelength of 1.55 μm are increasingly important. One of the challenges with 1.55 micron operation of semiconductor saturable absorber devices is the high concentration of In in the InGaAs absorber layer, required to achieve absorption at this wavelength. InGaAs is the material of choice in many known saturable absorbers. However, in order to cause the absorption edge to be energetically as low as 1.55 μm, the concentration of the In replacing the Ga when going from GaAs to InGaAs has to be rather high, i.e. the absorber material is $In_xGa_{1-x}As$ with x~50%–58%, and GaAs or AlAs. The admixture of In in such a high concentration, of course, also changes other material properties than the bandgap, one of them being the lattice constant. As a consequence, a much higher lattice mismatch has to be dealt with in 1550 nm semi conductor saturable absorber devices than, for example, in 1060 nm semiconductor saturable absorber devices. For example, the natural, relaxed lattice constant of $In_{0.53}Ga_{0.47}As$ is about 0.583 nm vs. 0.565 nm for GaAs and 0.566 nm for AlAs. InGaAs absorber layers grown onto or in GaAs or AlAs layers thus tend to relax—i.e. to re-adopt the natural InGaAs lattice constant at the price of a certain, high amount of generated defects—if a certain critical layer thickness is exceeded. The defects substantially reduce the device quality in terms of losses. Due to this lattice mismatch, most $In_xGa_{1-x}As$ (x>0.5) absorber layers will relax within 1–2 nm thickness, resulting in many defects. This brings about a decrease in the optical quality of the crystalline layers grown following the absorber layer, since defects tend to propagate through layers grown by epitaxy subsequently to the relaxed absorber layers.

A further important frequency used for telecommunication purposes corresponds to the free space wavelength of essentially 1.3 μm (i.e. the frequency equals the speed of light divided by about 1.3 μm.). In this case, the In concentration in the absorber material is lower, i.e. x~0.4. Although the lattice mismatch between $In_xGa_{1-x}As$ (x~0.4) and GaAs or AlAs is not as high as for 1.55 μm, ensuring epitaxial growth is still an important issue also in this system.

One method to avoid this is to grow lattice-matched layers. However, this requires using Bragg reflector materials such as InP/InGaAsP, or InP/AlGaInAs or AlInAs/AlGaInAs. The disadvantage of these material systems include a reduced index contrast between the mirror pairs, resulting in less reflectivity and less mirror reflectivity bandwidth for a given number of layer pairs (compared to GaAs/AlAs for example), more complex epitaxial growth processes in MOCVD or MBE machines, and increased losses in the structures, increased demands on the growth accuracy.

In U.S. Pat. No. 5,701,327, a semiconductor saturable absorber device for lasers operating at 1.55 micron is disclosed, which comprises a GaAs/AlAs Bragg mirror, onto which a InP "strain relief" layer is grown. The absorber layers are embedded in this InP strain relief layer. With InP grown on GaAs or AlAs, many defects are formed which may serve as recombination centers leading to an ultra-fast device response. However, such a semiconductor saturable absorber devices brings about comparably high losses.

A further challenge to be met with mode-locked solid-state lasers are Q-switching instabilities which are present at high frequencies. For passively mode-locked lasers using semiconductor saturable absorber mirror devices or similar devices for mode-locking, the onset of Q-switching instabilities limits the repetition rate (see U. Keller et al., "Semiconductor saturable absorber mirrors for femtosecond to nanosecond pulse generation in solid-state lasers," Journal of Selected Topics in Quantum Electronics (JSTQE), vol. 2, no. 3, pp. 435–453, 1996; and U. Keller, "Ultrafast all-solid-state laser technology", *Applied Physics. B*, vol. 58, pp. 347–363, 1994).

When the conditions necessary to avoid the Q-switching instabilities in passively mode-locked lasers are examined more carefully, the following stability condition can be derived:

$$(F_{laser}/F_{sat,laser}) \cdot (F_{abs}/F_{sat,abs}) > \Delta R \quad (1)$$

where $F_{laser}$ is the fluence in the laser material, $F_{sat,laser} = h\upsilon/\sigma_{laser}$ is the saturation fluence of the laser material, h is Planck's constant, $\upsilon$ is the center laser frequency, $\sigma_{laser}$ is the laser cross-section parameter (see W. Koechner, *Solid-State Laser Engineering*, 4th Edition, Springer-Verlag New York, 1996), $F_{abs}$ is the fluence on the absorber device, $F_{sat,abs} = h\upsilon/\sigma_{abs-eff}$ is the effective saturation fluence of the absorber, where $\sigma_{abs-eff}$ is the effective cross-section parameter of the absorber device, and $\Delta R$ is the modulation depth of the absorber device.

For further clarity we simplify Eq. (1) to the following:

$$S_{laser} \cdot S_{abs} > \Delta R \quad (2)$$

where $S_{laser}$ is the fluence ratio in the laser material, and $S_{abs}$ is the fluence ratio on the absorber. This reduced notation allows us to simplify the further discussion. To achieve the maximum figure of merit, one can change the laser design to increase the fluence ratio $S_{laser}$ in the laser material, or to increase the fluence ratio $S_{abs}$ in the absorber. In this document, approaches concerning the fluence ratio $S_{abs}$ in the absorber and the modulation depth $\Delta R$ are discussed.

Equation (2) can be used to scale a laser for operation at higher repetition rates. If all else remains constant (i.e., mode size in laser material and on the absorber, average power, and pulsewidth), as the repetition rate increases, the left-hand term decreases quadratically due to decreasing pulse energy. It is possible to avoid Q-switching under this condition by arbitrarily decreasing the modulation depth $\Delta R$. However, below a certain modulation depth, the absorber will not have a strong enough effect to start and sustain mode-locking.

The above mentioned U.S. patent application Ser. No. 10/016,530 shows an approach for solving this problem. The low field enhancement resonant design taught in this patent application leads to a field intensity which at the position of the absorber is enhanced by factors of up to 10 or more compared to conventional semiconductor saturable absorber device designs. As a consequence, the modulation depth is increased and the saturation fluence of the absorber is decreased by the same factor, if all other parameters are kept constant. By reducing the absorber thickness compared to conventional semiconductor saturable absorber devices, the modulation depth may be re-reduced to a 'conventional' value. By this measure, the above stability condition is satisfied for pulses with reduced fluence at the absorber, i.e. for pulse trains with increased repetition frequencies.

However, this important advantage comes at the cost of other more delicate optical properties. The group delay dispersion has a much more pronounced frequency dependence compared to conventional, anti-resonant designs. The bandwidth of the device is therefore reduced.

SUMMARY OF THE INVENTION

It is an object of the invention to provide an absorber device which is useful for operation at telecommunication frequencies and which does not suffer from drawbacks of prior art absorber devices. The device should allow for high repetition rate operation. Preferably, it also works in lasers with high average output power. According to a preferred embodiment, it should therefore for example have a good thermal response, i.e. heat should efficiently be conducted away from the absorber layer. According to further preferred embodiments, the number of crystal growth defects is minimized or optimized. The invention should preferably allow for a control of the group delay dispersion and have a reasonably high bandwidth.

According to a first embodiment of the invention, a semiconductor saturable absorber mirror device for reflecting at least a proportion of electromagnetic radiation of essentially one given optical frequency impinging on said device, comprises a substrate with a Bragg reflector, and on top of this Bragg reflector a layered structure with at least one layer with saturably absorbing semiconductor material. A low index dielectric coating layer is placed on an outermost surface of said structure, the index of refraction of said dielectric coating layer being lower than the lower of said first index of refraction and said second index of refraction. The Bragg reflector and the layered structure are designed in a manner that the intensity of radiation of essentially the given optical frequency impinging on the device takes up a maximum at or near the interface between said structure and said dielectric coating layer.

The intensity takes up a maximum "at or near" the interface, in the context of this specification, means that the intensity is not substantially reduced at the position of the interface compared to the closest intensity maximum. For example, this is the case within a distance from the intensity maximum of about a tenth or a sixteenth of the wavelength of the radiation in the respective material.

The thickness of the coating layer may be between a few nanometers and half a wavelength of radiation of the given optical frequency in the dielectric material. It may, as an alternative also be greater than half a wavelength. According to a first special embodiment it corresponds to substantially $(2n+1)/4$ times the wavelength of said radiation in said dielectric layer, where $n \geq 0$ = any whole number, so that the intensity at the device surface is at a minimum, the device thus being substantially anti-resonant. According to a second special embodiment it is at least an eighth of a wavelength but less than a quarter wavelength. According to yet another special embodiment it is more than a quarter wavelength but less than three quarters of a wavelength.

The index of refraction of the dielectric coating layer should be lower than the layers of the structure and of the Bragg mirror. For example, the index of refraction is below 2.2 or even below 2 or below 1.8. According to particularly preferred embodiments, the index of refraction is 1.6 or lower.

According to a further embodiment of the invention, the semiconductor saturable absorber device comprises a structure of layers, said structure comprising a semiconductor layer having a nonlinear optical absorption substantially at said frequency, and a dielectric coating layer placed adjacent to said structure, said dielectric coating layer having an index of refraction which is substantially lower than the index of refraction of the layers of said structure said structure being designed and arranged such that said semiconductor layer having a nonlinear optical absorption is placed at the interface to said dielectric coating layer and the field intensity of radiation of said given optical frequency in the device has a peak at said interface.

According to another embodiment of the invention, a semiconductor saturable absorber mirror device for reflecting at least a proportion of electromagnetic radiation of essentially one given optical frequency impinging on said device is provided, comprising a substrate, a stack of layers placed on said substrate, said stack comprising alternately layers of a first material having first index of refraction and of layers of a second material having a second index of refraction, said first and said second indices of refraction being different from each other, said stack being designed in manner that a Bragg reflector is formed, a layered structure comprising at least one layer with semiconductor material having a nonlinear optical absorption substantially at said frequency, and a dielectric coating layer placed on said outermost surface of said structure, the index of refraction of said dielectric coating layer being lower than the lower of said first index of refraction and said second index of refraction, wherein said stack of layers, said layered structure and said dielectric coating layer are designed in a manner that the field intensity of radiation of said given frequency takes up a minimum at or near the surface of said dielectric coating layer.

According to yet another embodiment, a semiconductor saturable absorber mirror device for reflecting at least a proportion of electromagnetic radiation of essentially one given optical frequency $\nu=c/\lambda$ with 1525 nm$<\lambda<$1575 or with 1300 nm$<\lambda<$1350 impinging on said device is provided, the device comprising a substrate, a stack of layers placed on said substrate, said stack comprising alternately layers of a first material having first index of refraction and of layers of a second material having a second index of refraction, said first and said second indices of refraction being different from each other, said stack being designed in manner that a Bragg reflector is formed, a layered structure comprising at least one layer with semiconductor material having a nonlinear optical absorption substantially at said frequency, and a dielectric coating layer placed on said outermost surface of said structure, the index of refraction of said dielectric coating layer being lower than the lower of said first index of refraction and said second index of refraction, wherein said stack of layers, said layered structure and said dielectric coating layer are designed in a manner that the field intensity of radiation of said given frequency at a position of said semiconductor material having a nonlinear optical absorption is enhanced compared to a device which comprises said substrate, said stack of quarter-wave layers, and said layered structure where the dielectric coating layer is replaced by semiconductor material with a corresponding optical thickness substantially at said frequency.

According to yet a further embodiment, a semiconductor saturable absorber mirror device for reflecting at least a proportion of electromagnetic radiation of essentially one given optical frequency impinging on said device comprises a substrate, a stack of layers placed on said substrate, said stack comprising alternately layers of a first material having first index of refraction and of layers of a second material having a second index of refraction, said first and said second indices of refraction being different from each other, said stack being designed in manner that a Bragg reflector is formed, a layered structure comprising at least one layer with semiconductor material having a nonlinear optical absorption substantially at said frequency, and a dielectric coating layer placed on said outermost surface of said structure, the index of refraction of said dielectric coating layer being lower than the lower of said first index of refraction and said second index of refraction, wherein said layered structure comprises a spacer layer, and further comprises said layer with semiconductor material having a nonlinear optical absorption substantially at said frequency, placed adjacent to said spacer layer, and a cap layer of semiconductor material placed adjacent to said layer with semiconductor material having a nonlinear optical absorption, wherein said dielectric coating layer is placed adjacent to said cap layer, wherein said cap layer has a thickness of substantially 20 nm or less, and wherein said field intensity of radiation of said given frequency takes up a maximum substantially at the position of said layer with semiconductor material having a nonlinear optical absorption substantially at said frequency.

The Bragg reflector in any of the above embodiments may for example be a stack of quarter wave layers, for example of alternately GaAs and AlAs. As an alternative, it may be a stack of alternately ⅜ wave and ⅛ wave layers, or a stack forming a chirped Bragg mirror. An absorber layer may for example be InGaAs. According to one example, it may be grown directly on top of the Bragg reflector, the layered structure then consisting of an absorber layer only.

The device according to the invention features the following advantages:

Field enhancement: The structure may be substantially anti-resonant (i.e. the field intensity at the surface may be minimal), but due to the low index of refraction of the dielectric coating layer, the field inside the structure and especially at the place of the absorber layer(s) is not as strongly reduced compared to the free space intensity as in conventional semiconductor saturable absorber devices. The quotient of the field intensity at the place of the absorber layer of a device according to the invention with the corresponding field intensity in a conventional semiconductor saturable absorber device is named "enhancement factor N" in the context of this application. As a consequence of the stronger field at the place of the absorber layer(s), the modulation depth is increased, and the effective saturation fluence of the absorber is reduced.

Reduced tendency of defects to propagate: Defects in the epitaxial layers will not be contiguous with defects in the coating layer and vice versa. Therefore, defects will not propagate between layers or interact with each other at the surface. Also, defects in wide-gap dielectrics are unlikely to be optically active in the near infrared and are therefore less of a problem for lasers or the kind of the laser according to the invention.

New design degrees of freedom: A direct consequence of the above mentioned enhancement of the modulation depth is that the absorber layer(s) may be grown thinner than in state of the art semiconductor saturable absorber devices for comparable laser devices. By this, the modulation depth is reduced while keeping the saturation fluence constant. In such a case, the above mentioned Q-switching threshold is improved, thus making operation at increased repetition frequencies and/or at increased average power possible. For example a thinner InGaAs absorber layer may also be grown strained and not relaxed. By this, the defect density in the absorber layer is strongly reduced. It is possible to decrease the absorber thickness by the enhancement factor N and still maintain a device which has similar performance parameters for passive mode-locking, i.e. similar mode locking driving force but reduced tendency to QML.

Passivation: The dielectric coating layer may stabilize the surface and prevent chemical reactions from taking place. Thus, it is also possible to use the field enhancement resonant structure as disclosed in the U.S. patent application Ser. No. 10/016,530, which could have a chemically unstable surface—by, for example, having the absorber layer on top of the structure—and add said dielectric coating layer, resulting in an inert structure.

Reduction of undesired effects: As well as preventing reaction, coating layers may also reduce other effects such as emission/sublimation of As and Ga. Also, in the particular case of reaction with oxygen, GaAs and InGaAs are likely to have a very high spin-orbit coupling efficiency. When radiation impinges on the device, this can result in the photoinduced formation of a singlet-state molecular-oxygen at the surface. This is a highly reactive species. Using a dielectric layer will reduce this effect and in the case of an oxide dielectric make it irrelevant.

Compact and easy to manufacture design: The entire device may be fabricated in a simple two-step process.

The invention also concerns any laser device comprising any embodiment of the absorber device according to the invention.

DESCRIPTION OF THE PREFERRED EMBODIMENTS

Figure 1:
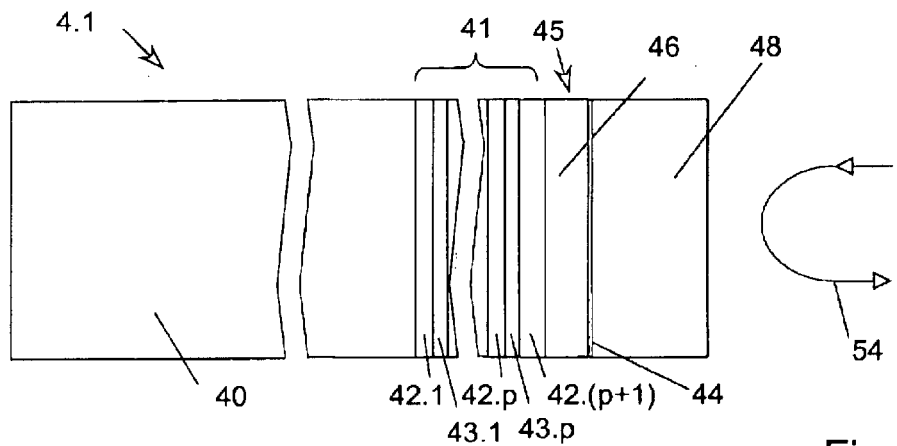
FIG. 1 is a schematic cross-section through a first embodiment of an antiresonant semiconductor saturable absorber mirror device according to the invention.

FIG. 1 illustrates a first preferred design of a semiconductor saturable absorber mirror device 4.1. The specific design starts with a gallium arsenide (GaAs) substrate 40 having a thickness within a range of typically 400 to 650 $\mu$m. A dielectric stack mirror 41 (typically called a Bragg reflector) grown on top of this substrate 40 comprises quarter-wave pairs of low-index/high-index material 42.1, ..., 42.$p$+1 and 43.1, ..., 43.$p$, respectively. The mirror 41 shown starts and ends with a low index material layer 42.1, 42.$p$+1, respectively, thus having an uneven number of layers.

The manufacturing of Bragg reflectors is well known to those skilled in the art of mirrors. First a quarter wave layer 42.1 of a low-index material, in this case aluminum arsenide (AlAs) with an index of refraction of n=2.89 and a thickness of approximately 134 nm (corresponding to a quarter wavelength of 1550 nm in the AlAs), is deposited onto the substrate 40. The deposition method is typically the well-established techniques of molecular beam epitaxy (MBE) or metal-organic chemical vapor deposition (MOCVD). A high-index layer 43.1 consisting of gallium arsenide (GaAs) with a refractive index of n=3.38 and a quarter-wave thickness of 115 nm is then deposited. Typically this is repeated approximately p=25 to 35 times (i.e., 25 to 35 times a low-index/high-index pair). Then, an other 134 nm AlAs layer 42.$p$+1 is deposited. Such a Bragg mirror 41 gives a reflectivity of typically higher than 99.5% and preferably higher than 99.9% at the center of its design wavelength. A reflection of incoming light is schematically depicted by an arrow 54.

The materials chosen for the Bragg reflector and the substrate have the following advantages. One advantage is that high quality GaAs substrates are available at moderate cost. Further, the contrast in the refraction index between GaAs and AlAs is relatively high. Thus, Bragg reflectors with relatively few layer pairs and a high reflectivity bandwidth can be manufactured. However, also other substrate and Bragg reflector materials can be used for a device according to the invention. One known example are the Bragg reflectors based on InGaAsP or AlGaInAs with varying concentrations of the elements. The materials of such reflectors have almost no lattice mismatch. Also, InP may be incorporated in such reflectors. InP has a not negligible two photon absorption cross section, which effect helps suppress a Q-switched mode-locked regime. The refractive index contrast, however is lower than for GaAs/AlAs making more layer pairs necessary, thus increasing the cost and the required accuracy of the layer thicknesses.

A structure 45 of layers is placed on top of the Bragg mirror 41. The structure 45 comprises a spacer layer 46 and an absorber layer 44. The thickness of the spacer layer is chosen such that, together with the absorber layer, it forms a half-wave layer or a multiple half wave layer, i.e. the thickness is slightly less than an integer multiple of half the wavelength of electromagnetic radiation of the chosen frequency in this material. In the specific embodiment shown, the spacer layer 46 is a GaAs layer of approximately 225 nm thickness. The absorber layer 44 is deposited on top of the spacer layer 46. Note that the different index of refraction of the absorber layer 44 compared to the spacer layer 46 and its thickness have to be taken into account for designing the completed spacer-layer thickness, although for most designs this slight difference is negligible. In one embodiment, the absorber layer 44 is a 5 nm indium gallium arsenide ($In_xGa_{1-x}As$) layer, where the ratio x of the indium is 53% and the ratio of the gallium is 1−x=47%. This sets the absorption bandgap of the semiconductor absorber layer 44 to substantially 1550 nm. (meaning, of course, that the absorption bandbap EG equals to $E_G \approx h*c/1550$ nm, where h is Planck's constant and c is the vacuum speed of light). More generally, the preferred range for 1550 nm is set by $50\% \leq x \leq 58\%$.

As mentioned, an other important telecommunication free space wavelength is in the 1300 nm region. Although the examples presented here, in order to keep this text concise, mainly concentrate on devices for 1.55 μm free space wavelength radiation, the expert will know that with some modifications concerning the layer thicknesses or the above mentioned parameter x, the teaching of the invention presented in the following also apply to 1.3 μm free space wavelength radiation or to any other wavelength. For example, the indium concentration parameter for 1.3 μm is chosen to be x~0.4. The layer thicknesses of the Bragg reflector layers and of the layers of the structure—possibly except the absorber layer—and of the coating layer is, compared to the 1.55 μm device, chosen to be lower by a factor of about 1.3/1.55, adjusted to account for the differences of the refraction indices between the two wavelengths in the respective materials. For other wavelengths, similar transformations apply.

The absorber layer can be thick enough to exceed the relaxation thickness, or could even be made thin enough to be below than the relaxation thickness. This structure 45 is designed such that it substantially ends at the peak of the electric field. On top of the structure, i.e. adjacent to the absorber layer 44, a dielectric coating layer 48 is deposited. The dielectric coating layer 48 may for example be a $SiO_x$ ($1 \leq x \leq 2$) layer with index n~1.44. As an alternative, it may be any other low index dielectric layer, for example a $TiO_2$ layer, an $Al_2O_3$ layer, a $Si_3N_4$ (silicon nitride) layer, a Si (silicon) layer etc. The thickness of this layer may be chosen arbitrarily, so that the device optical properties may be tuned according to particular needs. As an example, it may be chosen in a way that it corresponds to substantially a quarter wavelength of the 1550 nm radiation in this material. Due to this, the electric field ends at a node at the dielectric-air interface, i.e. the entire structure is antiresonant. This also reduces the amount of group delay dispersion compared to structures where the electric field ends at a maximum, as will be shown below.

Further, the electric field ending on a node greatly reduces the occurrence of photo-induced surface chemistry.

However since a low-index dielectric coating, the electric-field intensity inside the device is actually enhanced, compared to a similar structure where the dielectric is replaced with for example GaAs of index n=3.6. This enhancement factor N may be as high as approximately 5 to 6 if the dielectric layer thickness is a quarter wavelength. Note that for this field enhancement, the thickness of the dielectric coating layer could also be chosen to be ¾, 5/4, . . . of a wavelength. However, choosing thicker coatings will also change the GDD structure and bandwidth. The person skilled in the art will know these changes and how to handle them.

The structure 45 together with the coating layer 48 does not substantially modify the reflectivity or wavelength range of the Bragg mirror 41, except for an increase of the penetration into the mirror structure and a resulting slightly higher transmission loss for a fixed number of Bragg pairs. As such, the structure is clearly different from a structure comprising an "anti-reflection" coating.

The absorber layer 44 or several absorber layers can be positioned at an arbitrary point in the electric field of the optical beam within the semiconductor saturable absorber device 4.1, by selecting the position of the absorber layer 44 within the structure 45. Preferably, the absorber layer 44 is positioned at or near a maximum of the field intensity in order to achieve maximum saturation of the absorber 44 for a given incident optical intensity, and to achieve a minimum effective saturation fluence for the semiconductor saturable absorber device 4.1. Thus the absorber layer 44 is preferably placed at the structure 45/coating layer 48 interface (as shown in the figure) or at a essentially a distance of λ/2, 2λ/2, 3λ/2, . . . from this interface, where λ is the wavelength of the laser radiation in the layer(s) between the absorber layer and the surface. Of course, absorber material may be present in a plurality of the group of positions comprising the interface position and positions of essentially a distance of λ/2, 2λ/2, 3λ/2, . . . from this interface.

The thickness of the absorber layer 44 sets the total amount of change in absorption (i.e., the modulation depth ΔR) of the semiconductor saturable absorber device 4.1. In our described example, the InGaAs absorber layer 44 is approximately only 5 nm thick. This is substantially less than for absorber layers according to the state of the art. The modulation depth is nevertheless as high as between 0.5% and 1.0%. (the difference depending on the exact growth and fabrication of the semiconductor saturable absorber device). This is due to the specific design in which the intensity in the absorber layer is increased by a factor 6 compared to the antiresonant conventional semiconductor saturable absorber device design. According to other embodiments of the invention, the absorber layer thickness can thus be chosen to be even lower, for example anywhere between about 1.0 nm and 5 nm, or alternatively can be chosen to be higher than 5 nm.

As previously discussed, the device according to the invention may have a strongly reduced defect density compared to state of the art semiconductor saturable absorber devices. Defects in the absorber layer may, depending on the particular laser design, also have a positive effect: They reduce the recombination time in the absorber and may thus be advantageous for pulse generating lasers with very high repetition frequencies and/or very short pulses. According to embodiments of the invention, the absorber layer and the dielectric coating layer may be designed to deliberately contain defects. It is a crucial aspect of the device according to the invention that the strongly increased field intensity at the position of the absorber introduces new design degrees of freedom. The absorber layer thickness and the coating layer material and thus indirectly the defect density may be chosen according to the particular needs, whereas according to the state of the art the requirements of sufficient modulation depth of low losses, and of being off the QML did not leave much choice for the semiconductor saturable absorber device design.

Additionally, the strongly reduced saturation fluence relaxes the requests on the cavity design for lasers with very high repetition rates (>9 GHz), which before often have been driven by the very small spot size in the semiconductor saturable absorber device required to saturate it given the rather low intracavity pulse energies.

Whereas in the described example the absorber layer is an InGaAs layer, also other materials known to the expert may be used. An interesting material in this context is $In_xGa_{1-x}As_{1-y}N_y$, where x and y are chosen such that there is a reduced or no lattice mismatch between the absorber material and GaAs or AlAs. As an example y may be chosen to be a few percent, for example $3\% \leq y \leq 8\%$, whereas $25\% \leq x \leq 50\%$ such that there is a substantially reduced strain between GaAs(001) and the absorber material.

The structure may further comprise thin further coating layers, the thickness of which is clearly below a quarter wavelength.

The following figures show some optical properties of the device of FIG. 1, the dielectric coating layer thickness corresponding to a quarter wavelength.

Figure 2:
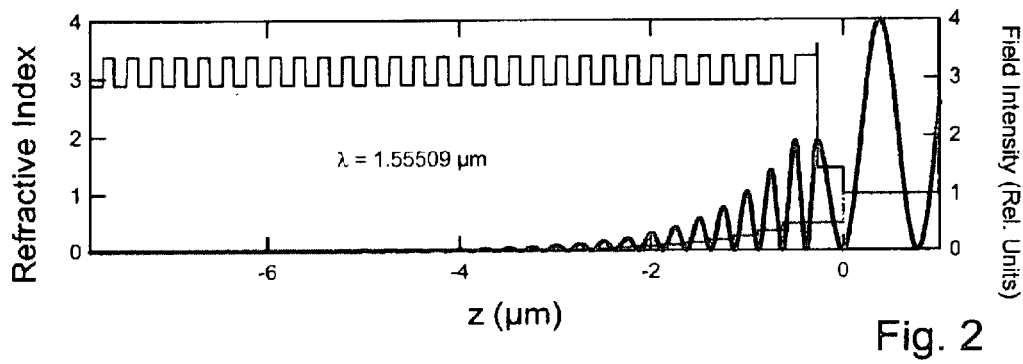
FIG. 2 is a graphical representation of the relative field intensity and the refractive index vs. position for this semiconductor saturable absorber device.
Figure 3:
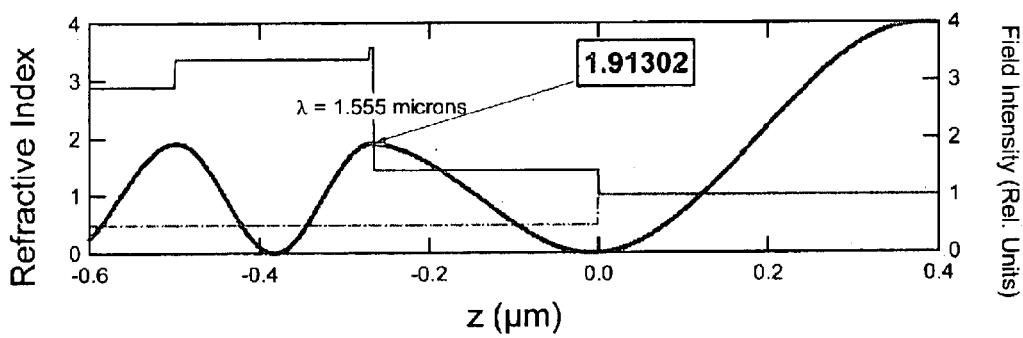
FIG. 3 is a close up of FIG. 2 for the topmost part for the semiconductor saturable absorber device.

FIG. 2 shows the relative field intensity and the index of refraction versus a position for a semiconductor saturable absorber device according to the invention, i.e., the embodiment shown in FIG. 1. FIG. 3 shows a close-up of the field and refractive-index map of FIG. 2 in the region of the spacer layer. In contrast to state of the art antiresonant semiconductor saturable absorber devices (Properties of standard antiresonant semiconductor saturable absorber devices are for example discussed in the U.S. patent application Ser. No. 10/016,530), the spacer layer of the semiconductor saturable absorber device according to the invention has a thickness such that the structure 45 on top of the Bragg reflector 41 would essentially fulfill a resonance condition for the standing electromagnetic waves in the spacer layer if it were not for the dielectric coating layer. In other words, the design is such that the field intensity reaches a local maximum in the vicinity of the structure/coating layer interface. As described above, in this design, the Bragg mirror's 41 outermost layer (i.e. the layer which is most distanced from the substrate) is a low-index layer 42.p+1. Thus the above condition is equivalent to the condition that the spacer layer 46 has a thickness of essentially $\lambda/2, 2\lambda/2, 3\lambda/2, \ldots$, where $\lambda$ is the wavelength of the laser radiation in the spacer layer. Note that in the design of FIG. 1, the absorber layer 44 could also be placed between the Bragg reflector 41 and the spacer layer 46. As yet another alternative, instead of just one absorber layer, two or more absorber layers of for example. reduced thickness can be present, preferably all of them placed near local maxima of the intensity.

It should be noted that the maximum relative field intensity at the absorber is about 1.91, i.e., about 6 times as high as in the antiresonant design shown in FIGS. 1 and 2. This results in a decrease in the saturation fluence by a factor of 6.

Figure 4:
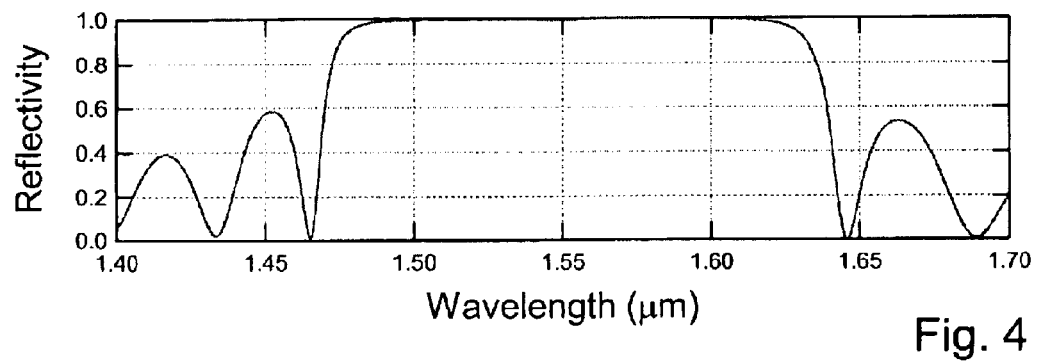
FIG. 4 is a graphical representation of the reflectivity vs. light wavelength for the semiconductor saturable absorber device.
Figure 5:
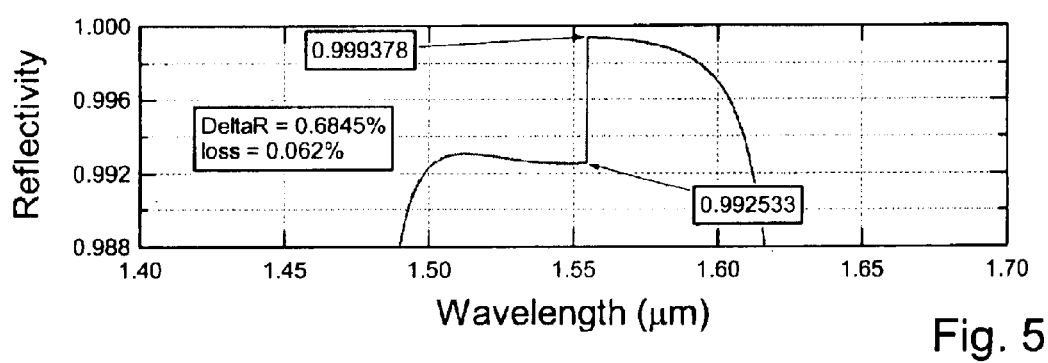
FIG. 5 is a close-up of the center part of FIG. 4 with a different scale

The low-intensity reflectivity calculated for the semiconductor saturable absorber device of FIG. 1 is plotted in FIGS. 4 and 5. The discontinuity in the model of the reflectivity as a function of the free-space wavelength is the result of the way the optical constants of the InGaAs layer are modeled. The optical constants are chosen deliberately to extract the predicted modulation depth. Compared to standard anti-resonant semiconductor saturable absorber devices, the modulation depth (denoted by DeltaR in all figures) is clearly enhanced $\Delta R=0.68\%$. In addition, the total reflectivity for a given number of low-index/high-index pairs is slightly reduced due to the increased total intensity in the Bragg reflector. The non-saturable losses amount to 0.06% (only counting the leackage through the Bragg mirror, additional non-saturable losses are caused by defects etc.). This can be compensated for by a slightly increased number of Bragg pairs.

Figure 6:
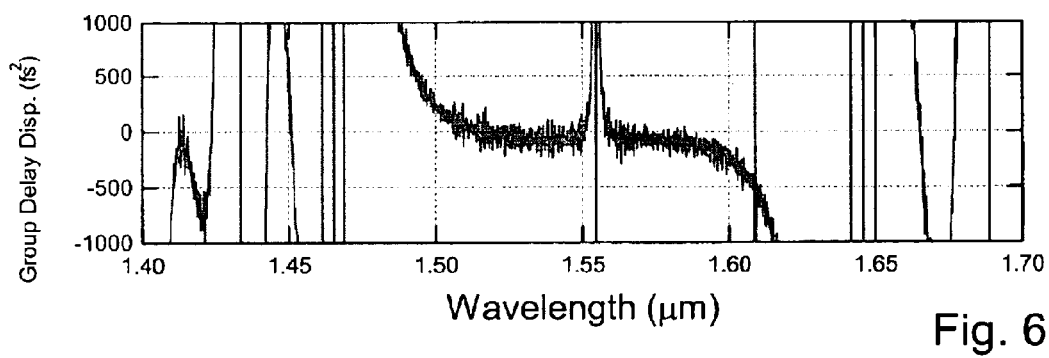
FIG. 6 is a graphical representation of the group delay dispersion vs. light wavelength for the semiconductor saturable absorber device.

A graphical representation of the group delay dispersion calculated for the semiconductor saturable absorber device of FIG. 1 is shown in FIG. 6. As becomes evident from the figure, the group delay dispersion exhibits a very smooth behavior with a not at all pronounced wavelength dependence over the 1510 nm to 1580 nm wavelenth range. This makes clear that the device according to the invention combines advantages of both, of the 'standard' antiresonant semiconductor saturable absorber device according to the state of the art (i.e. a gentle group delay dispersion) and of the low field enhancement resonant semiconductor saturable absorber device (i.e. a field which is enhanced at the absorber leading to an increased modulation depth and a decreased saturation fluence).

As a remark, the pronounced feature at the absorption edge (1555 nm) in FIG. 6 and the further GDD representations to follow below is an artifact which is due to a numerical error where the absorber is modeled. The real group delay dispersion does not have a "glitch" of the kind shown in the figures.

With reference to FIGS. 7 through 19, different embodiments of the semiconductor saturable absorber device according to the invention are described. In order to make the description more concise, only the differences to the semiconductor saturable absorber device of FIG. 1 are pointed out. In analogy to the above figures, these figures also comprise representations of the refractive index and the intensity vs. position as well as of the reflectivity and the group delay dispersion vs. wavelength. The values of the relative intensity at the absorber position, of the modulation depth and of the non-saturable losses are shown in the figures and mostly not mentioned any further in the text.

Figure 7:
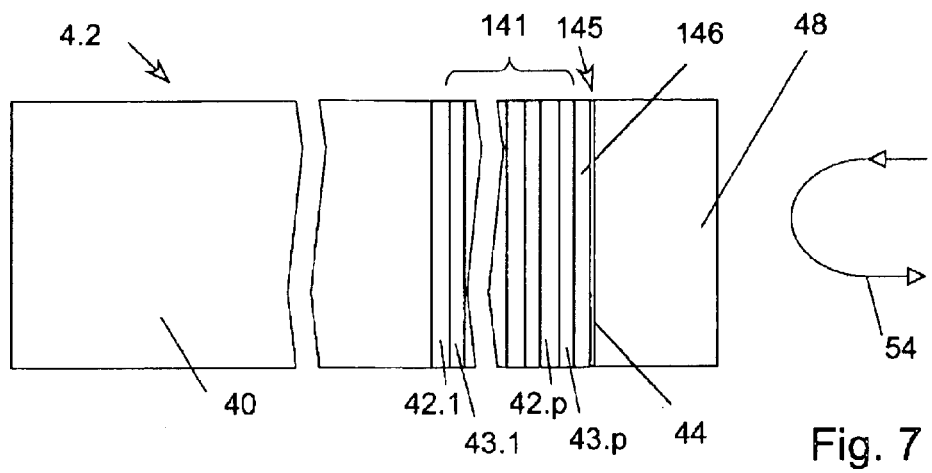
FIGS. 7–12 represent a schematic cross section, a graphical representation of the relative field intensity, a close up of said graphical representation, a representation of the reflectivity vs. the light wavelength, a close up of said representation and a graphical representation of the group delay dispersion, respectively, for a second embodiment of the semiconductor saturable absorber device according to the invention.
Figure 8:
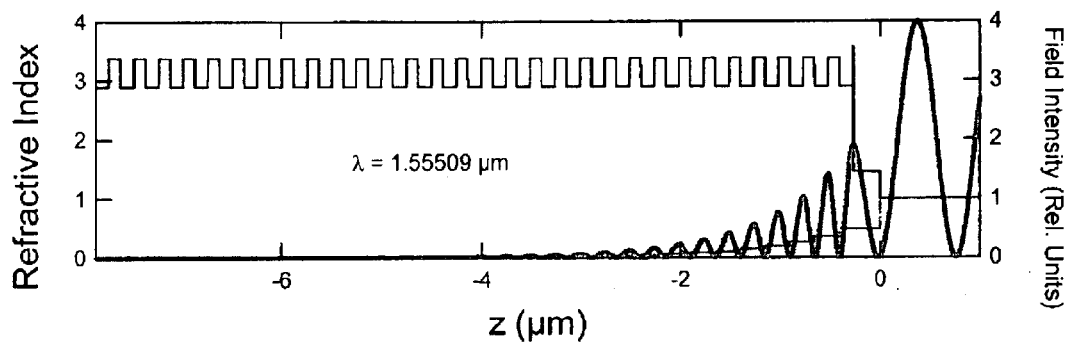
Figure 9:
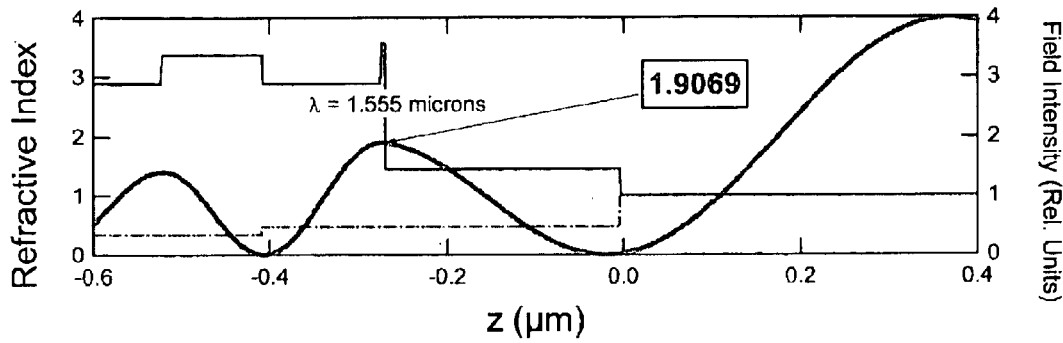
Figure 10:
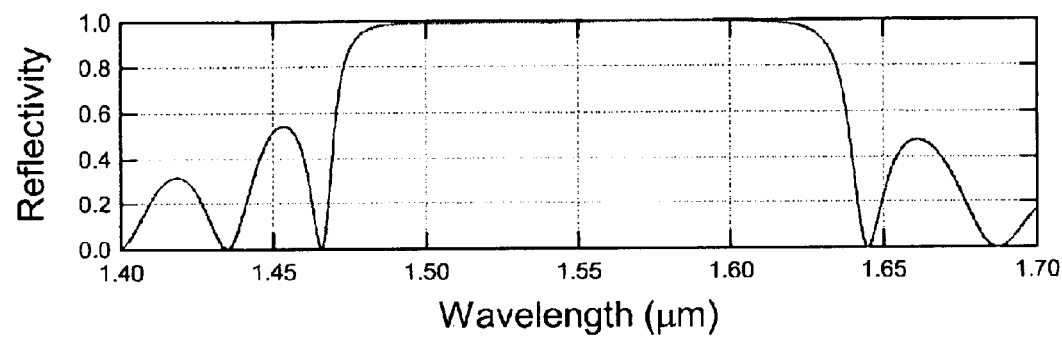
Figure 11:
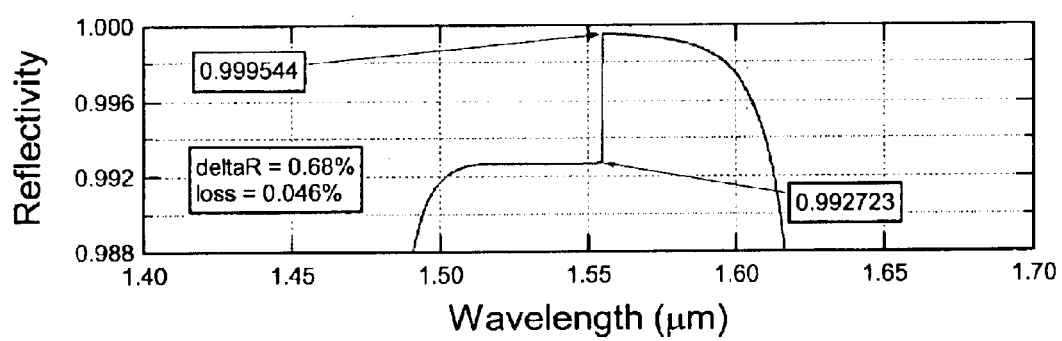
Figure 12:
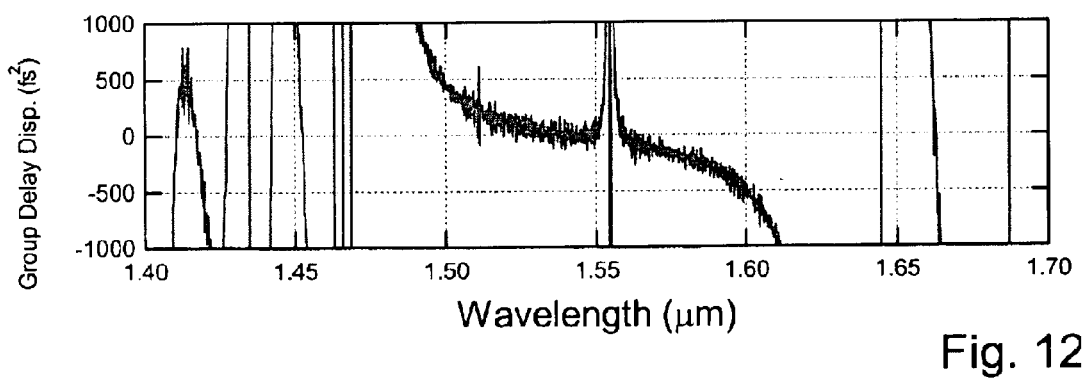
Figure 13:
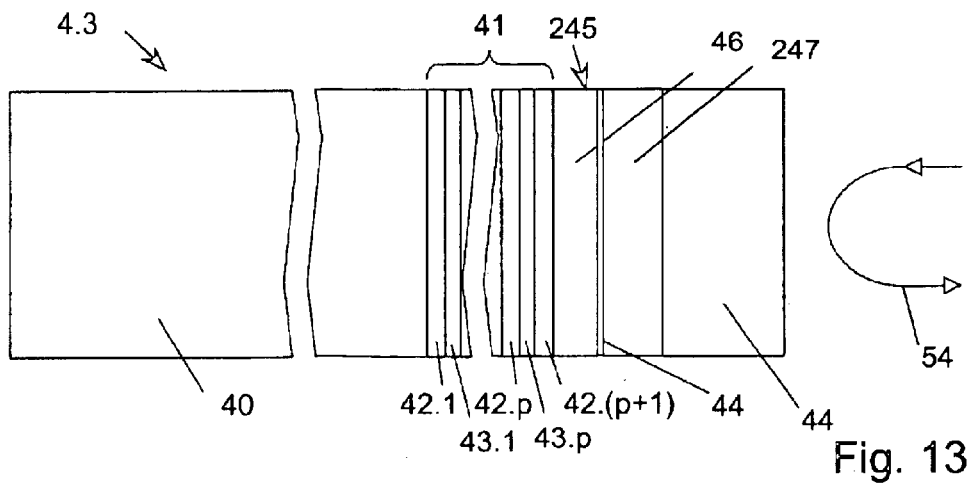
FIGS. 13–18 represent a schematic cross section, a graphical representation of the relative field intensity, a close-up of said graphical representation, a representation of the reflectivity vs. the light wavelength, a close up of said representation and a graphical representation of the group delay dispersion, respectively, for a third embodiment of the low field enhancement resonant semiconductor saturable absorber device according to the invention.
Figure 14:
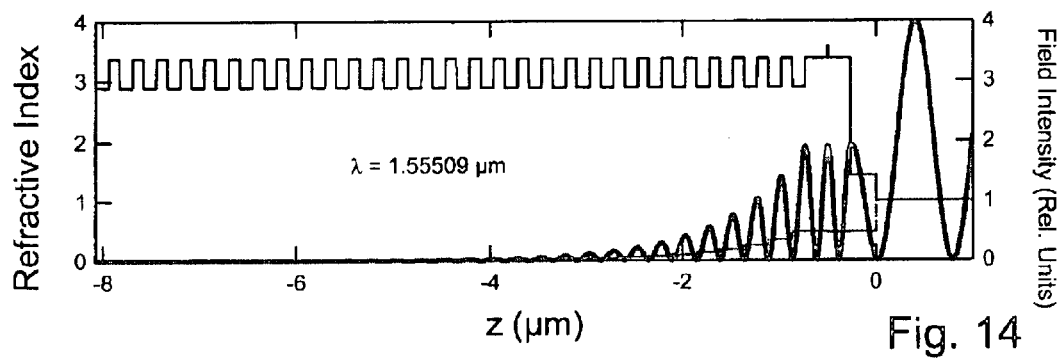

The semiconductor saturable absorber device 4.2 of FIG. 7 has a Bragg reflector 141 with an even number of layers, i.e. an entire set of Al/As 134 nm/GaAs 115 nm pairs. The structure 145 consists of approximately 129 nm AlAs (i.e. the low index material) spacer layer 146 and a 5 nm $In_{0.53}Ga_{0.47}As$ absorber layer 44 at the structure top surface. The spacer layer 146 and the absorber layer 44 add up to substantially a quarter-wave layer. Of course, the thickness of the absorber layer 44 may, as in all other examples, be adapted to the desired modulation depth. The thickness of the low index material spacer layer 146 may, as an alternative to the shown set-up, have an arbitrary number of other half-waves added to it making the structure 145 a ¾, ⁵⁄₄, . . . wave layer. The dielectric coating layer 48 has an arbitrary thickness. However in the following figures, again a layer thickness corresponding to a quarter wavelength is assumed.

FIGS. 8 through 12 demonstrate that the optical properties are similar to the properties of the device of FIG. 1, the group delay dispersion showing an only slightly more pronounced behavior.

An other important difference between the device of FIG. 1 and the device of FIG. 7 is the thermal response. AlAs is, compared to GaAs, a much better heat conductor. Thus, heat in the embodiment of FIG. 7 is more effectively transported away from the absorber layer, making it suitable for operation with high average intensity.

Note that AlAs is a rather reactive compound. The dielectric coating layer according to the invention allows an AlAs layer to be the topmost or almost the topmost layer of the structure 145, since surface reactions are reduced or prevented.

Figure 15:
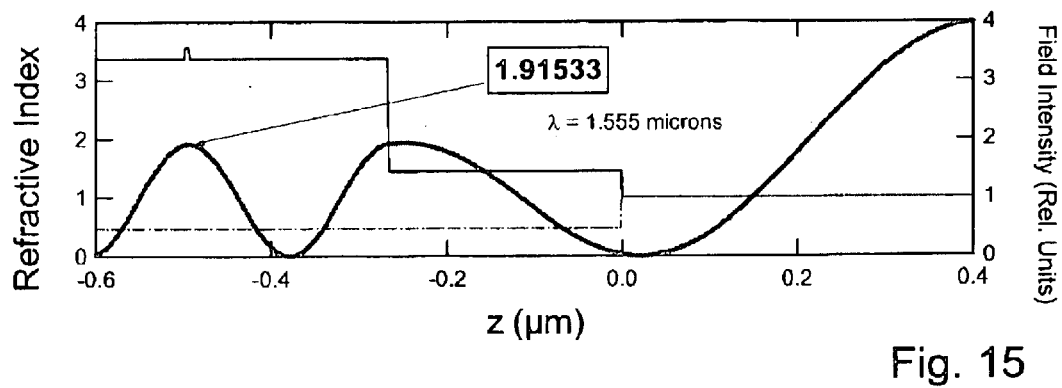
Figure 16:
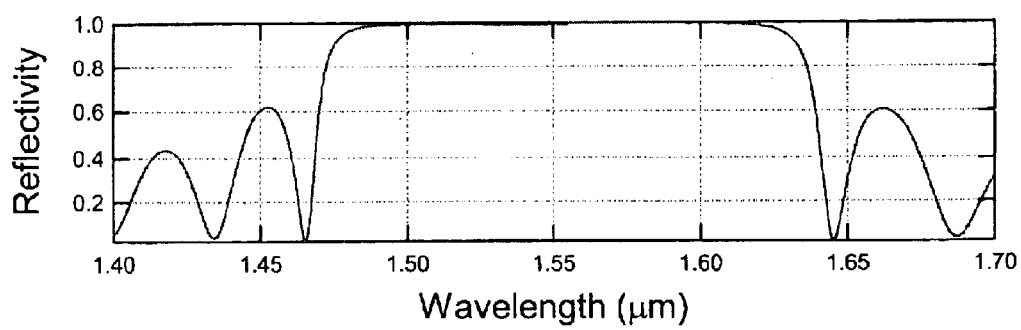
Figure 17:
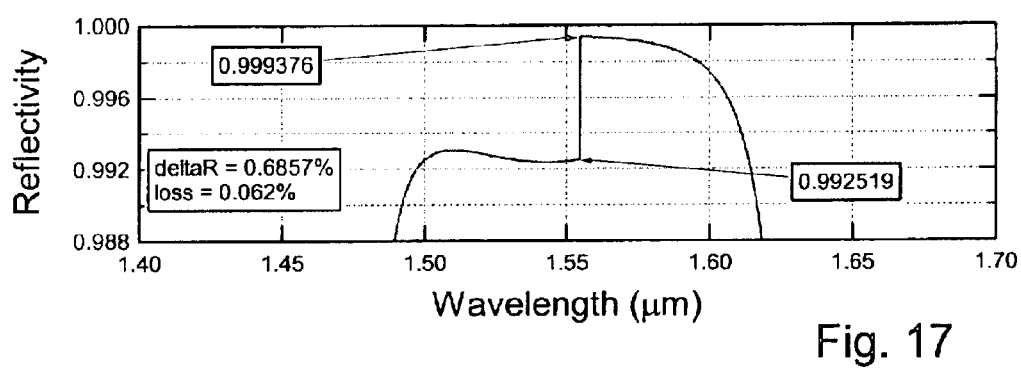
Figure 18:
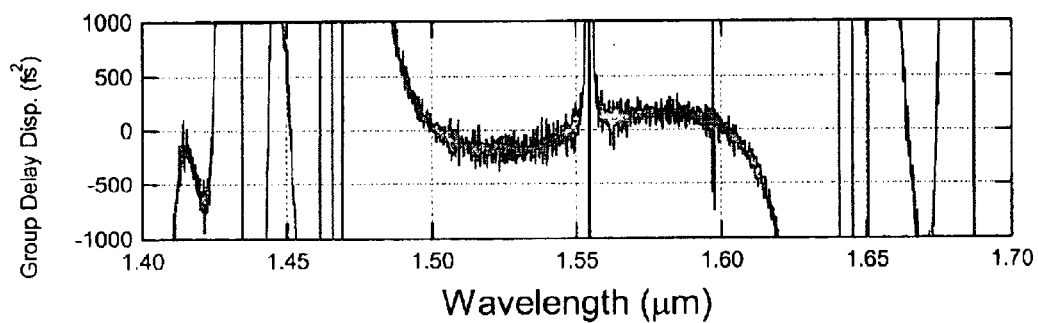

The absorber layer does not have to be placed on top of the structure, but may for example also be embedded in a spacer layer. The set-up of 13–18 is an example of a device with a buried absorber layer, i.e. an absorber layer 44 placed within the structure 245 at a position at or near a local maximum. The structure 245 comprises a first GaAs layer 46 of approximately 229 nm thickness. The $In_{0.53}Ga_{0.47}As$ absorber layer 44 has for example a thickness of about 1 nm–5 nm only. At least if the absorber layer thickness is below about 1 nm–2 nm, it is below the critical thickness, and the absorber layer is strained and not relaxed. Together with the first GaAs layer, the absorber layer forms a half-wave layer. A second GaAs layer 247 (thickness: 230 nm, i.e. a half-wave layer) completes the structure. The structure can be viewed as consisting of a spacer layer with an embedded absorber layer, the spacer layer being formed by the first and the second GaAs layers 46, 247. As soon as the absorber layer thickness exceeds the critical thickness, structures with buried layers may not be as advantageous concerning the defect density as the above described structures 45, 145 with absorber layers placed at the interface to the dielectric coating layer. However, the second GaAs layer brings about an advantage, too. It improves the thermal response, since the heat can flow out of the absorber layer on both sides of the absorber. In addition, in cases where a large defect density is desired or where it is not an issue, also such devices may be used. The advantage of a relatively enhanced field combined with an antiresonant behaviour remains, as is illustrated in FIG. 15.

Figure 19:
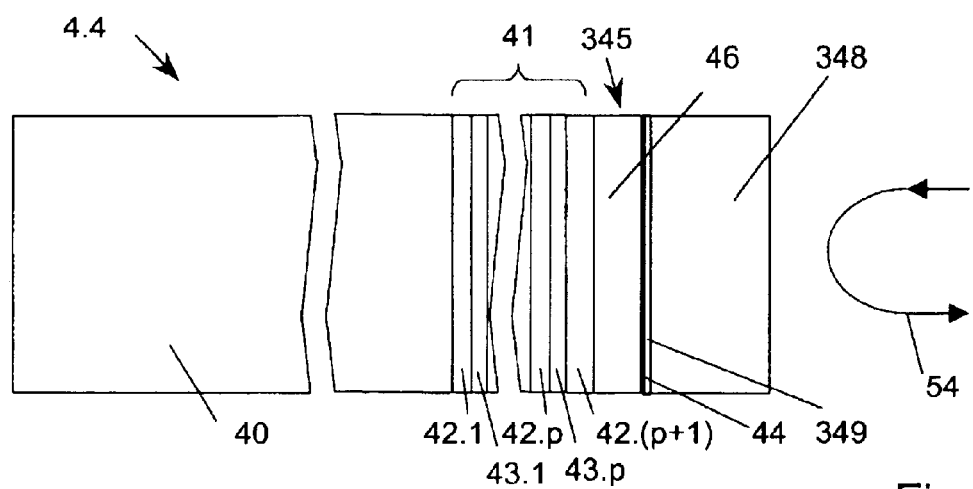
FIG. 19 shows a schematic cross-section through a fourth embodiment of an antiresonant semiconductor saturable absorber mirror device according to the invention.

A further embodiment of the invention which is very similar to the embodiment shown in FIG. 1 is represented in FIG. 19. Only the difference between the device 4.4 shown in this figure and the device 4.1 shown in FIG. 1 are described here. In contrast to the embodiment of FIG. 1, the structure 345 comprising the absorber layer 44 comprises a GaAs cap layer 349 having a thickness below 20 nm, for example between 5 nm and 10 nm. The cap layer prevents, during the manufacturing process, the semi-finished device which is taken out of the MBE (Molecular Beam Epitaxy) stage to a coating stage from being oxidized at the surface.

Of course, the cap layer may also comprise other semiconductor materials than GaAs, for example Si, Ge, or compounds thereof, etc.

In the embodiment shown here, the structure 345 is designed such that the field intensity is at a maximum at the position of the absorber. Therefore, the field intensity at the interface between the structure 345 and the coating layer 348 is not exactly at the maximum but close to it. The dielectric coating layer 348 may or may not, compared to the coating layer of the device 4.1 of FIG. 1, be reduced in thickness, in a manner that the total optical thicknesses of the cap layer 349 and the coating layer 348 add up to substantially a quarter wavelength of an odd multiple of a quarter wavelength, depending on the desired group delay dispersion.

Note that an analogous modification including a thin cap layer may also be used for the device 4.2 of FIG. 7.

Figure 20:
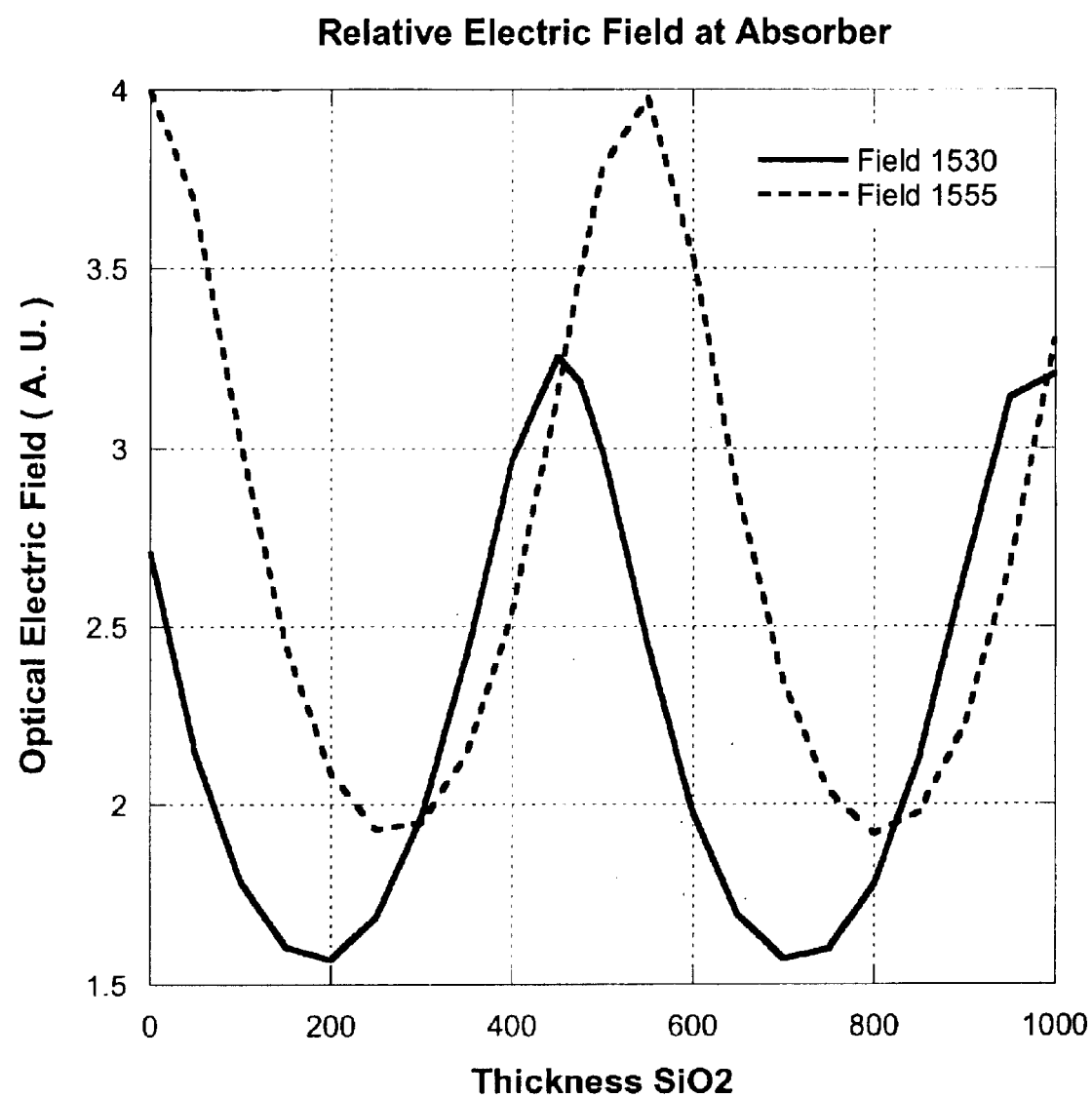
FIG. 20 shows the relative field intensity at the absorber layer of a semiconductor saturable absorber device according to the invention, as a function of the dielectric coating layer thickness, for two different radiation wavelengths
Figure 21:
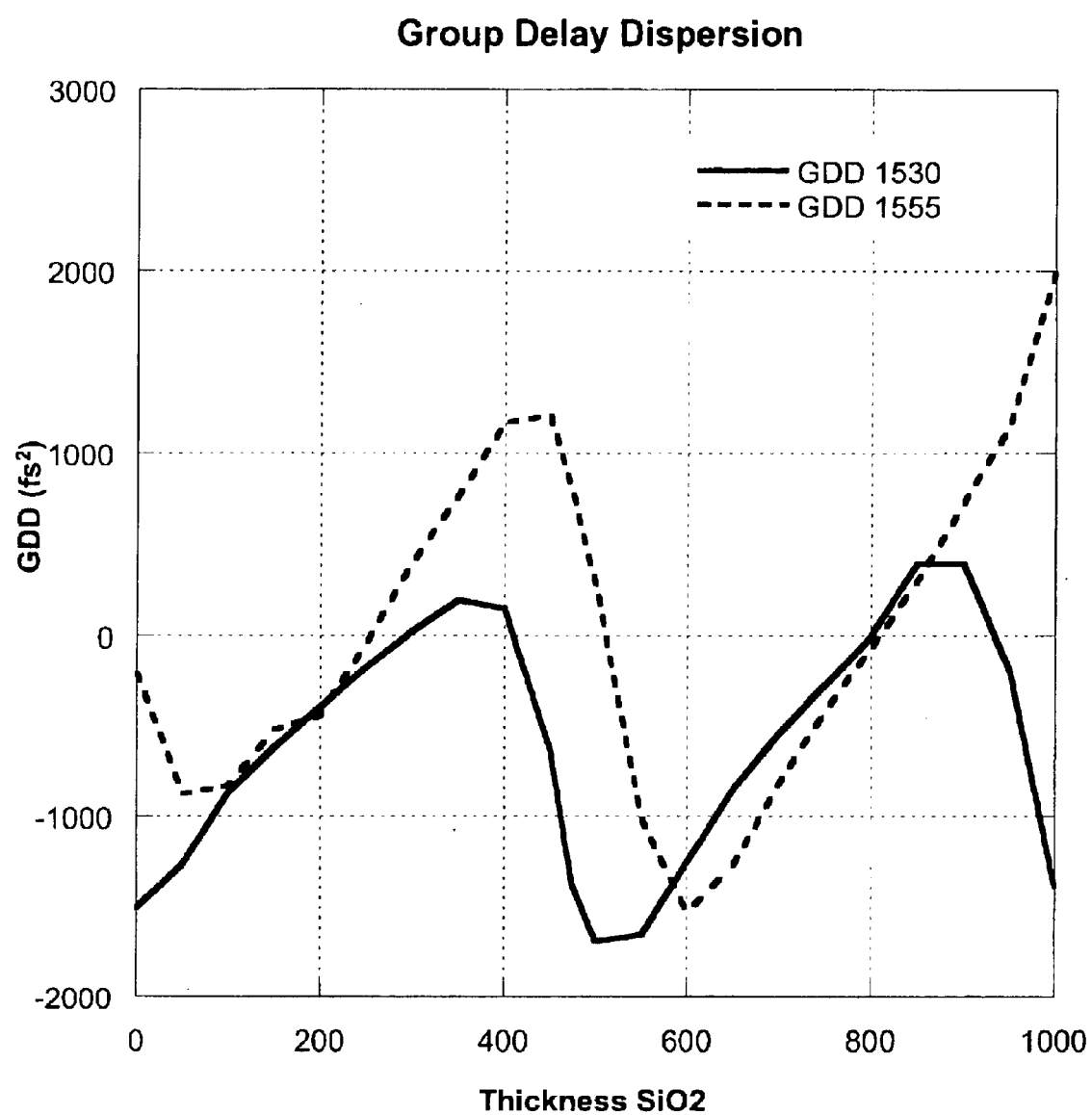
FIG. 21 shows the group delay dispersion of a semiconductor saturable absorber device according to the invention as a function of the dielectric coating layer thickness.

FIGS. 20 and 21 represent the dependence of two key device properties on the dielectric coating layer thickness. In the example shown, the device comprises a Silicon Oxide coating layer. In this material, half a wavelength of 1550 nm radiation corresponds to approximately 538 nm.

The figures show the dependence of the field intensity and of the group delay dispersion (GDD) on the coating layer thickness of a device as shown in FIG. 1. In FIG. 19, the field intensity is shown in the units of the previous figures, whereas in FIG. 20, the group delay dispersion (GDD) in $fs^2$ is shown. Both Figures comprise representations of the respective quantities for radiation having a free space wavelength of 1555 nm ("Field 1555", "GDD 1555") and of 1530 nm ("Field 1530", "GDD 1530"). As can be seen in the figures, both quantities show a quasi-oscillatory behavior with a period of about half a wavelength.

Of course, according to the invention any structure comprising material with a nonlinear optical absorption can be combined with any dielectric coating layer of any thickness. Also embodiments where the dielectric coating layer consists of a plurality of dielectric layers of different materials may be envisaged.

Further, the invention also comprises devices comprising a structure with material having a non-linear optical absorption and a dielectric coating layer for which the field intensity of radiation of the given wavelength does not have a local maximum at the interface between the structure and the dielectric coating layer. The invention for example generally comprises semiconductor saturable absorber devices for which the field intensity at the surface, i.e. at the dielectric coating layer/air interface is minimal. The invention also generally comprises semiconductor saturable absorber devices designed for an telecommunication effective free space wavelength, for example a free space wavelength around 1550 nm or around 1300 nm, which comprise a dielectric coating layer leading to an field enhancement effect at the absorber.

Figure 22:
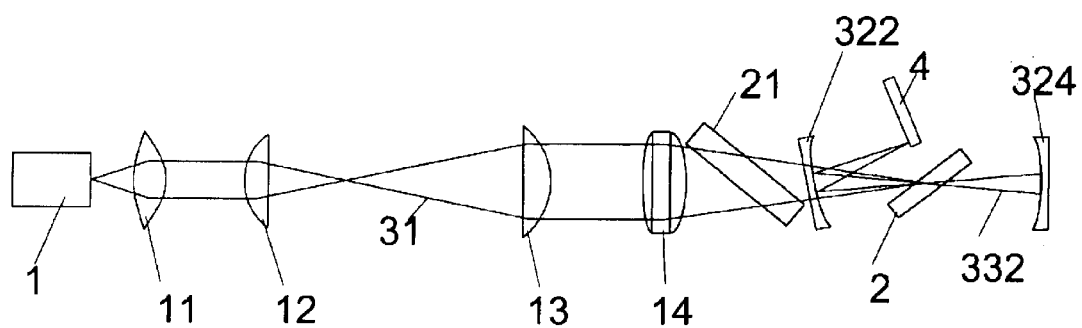
FIG. 22 shows a schematic representation of a laser according to the invention.

Referring now to FIG. 22, a high-brightness, single-mode diode laser 1 (Nortel Model G06d), which emits 980 nm laser light 31 of up to 0.5W from an aperture size of approximately 1.8 μm by 4.8 μm, is collimated by a short focal length high numerical aperture aspheric pickup lens 11 (focal length 4.5 mm). The beam is then expanded in tangential direction with help of a ×2 (times-two) telescope made of cylindrical lenses 12, 13. This telescope turns the elliptic pump beam into an approximately round one and it allows for astigmatism compensation. An achromatic lens 14 is used to focus the pump beam 31 through one cavity mirror 22 down to a radii between 20 and 80 μm in the free space. Between the focusing lens 14 and the cavity mirror 22, a dichroic beam splitter 21 is placed (highly reflective for wavelengths around 1550 nm and highly transmissive around 980 nm under 45° incidence) in order to deflect any laser light directed to the pump laser 1.

Although single-mode pump diodes are preferable, other formats pump of diodes may also be used with properly designed pump optics. For example a 1W output power from a 1×50 micron aperture broad area diode laser (slightly reduced brightness, but still a so called high-brightness pump laser) emitting at substantially 980 nm (Boston Laser Model 1000-980-50) can also be used to achieve good lasing performance. The advantage of the higher brightness, and in particular the single-spatial-mode diode laser, which has very high brightness, is that for a given pump mode radius the divergence of the pump beam is smaller. This allows for mode matching of the pump beam to the laser mode over the entire length of the gain element even for very small laser and pump spot sizes and thus results in a maximized saturation parameter $S_{laser}$ of the laser ($S_{laser}=F_{laser}/F_{sat, laser}$). The number of elements of the pump optics can reduced by using special astigmatic lenses. Likewise a fiber coupled pump element with a comparable brightness can be used.

This pump source (using varying focal length of the achromatic lens 14) is used for four different laser set-ups which all have in common that they have a small laser mode size in the gain medium as well as on the semiconductor saturable absorber device. These small mode areas are crucial to suppress the laser from operating in the QML regime. The gain element in all these four cavities is a 1 mm thick Kigre QX/Er phosphate glass doped with 0.8% Erbium and 20% Ytterbium (i.e., the glass melt was doped with 0.8% $Er_2O_3$ and with 20% $Yb_2O_3$). The thickness of the gain medium is chosen to be not significantly more than the absorption length, to minimize the re-absorption losses. The described laser cavities contain a Brewster/Brewster-cut gain element. Analogous cavities can be constructed with flat/Brewster or flat/flat gain elements, compensating for the change in astigmatism.

The cavity shown in the figure is a so-called "dog-leg" cavity. This laser resonator is formed by three mirrors. One is a semiconductor saturable absorber mirror device 4 of the kind discussed above. The other ones are concave curved mirrors 322, 324. The first curved mirror 322 has high reflectivity around 1550 nm and high transmission around 980 nm. The second curved mirror 324 is a concave curved output coupler with a transmission of 0.2–2% at the laser wavelength (around 1550 nm). The Er:Yb:glass gain element 2 is inserted under Brewster angle close to the beam waste of the laser beam 332 between mirror the first and the second curved mirror 322, 324. The gain element has dimensions of 9×9 mm² in cross-section with a nominal length of 1 mm (note that the gain element can also be a flat/Brewster element or a flat/flat shaped element with an additional polarization selective element in the cavity). The cavity length is set according to the required laser repetition rate (for example about 15 mm for 10 GHz operation). The curvature of the first curved mirror 322 can be much smaller than the cavity length (for example radius of curvature 4.1 mm). The curvature of the second curved mirror 324 is chosen so as to get the desired mode size in the gain medium and the desired cavity length. A reasonable value for 10 GHz operation is a radius of curvature of 5 mm. This cavity allows for very small mode sizes of the laser light in the gain medium and on the semiconductor saturable absorber device, which in addition can be custom designed independently. The mode size of the pump light 31 in the gain element has to be about equal to the mode size of the laser light 332 at this position. This sets the focal length of the focusing lens 14. Again, the dichroic mirror 21 is then use to avoid any feedback of laser light leaking through the high reflector 322 into the pump laser or the pulse generating laser itself. This cavity allows for individual adjustment of the mode sizes in the gain medium and in the semiconductor saturable absorber device, still having small mode sizes in the gain. In addition to these advantages, this cavity design shows a small effect of spatial hole burning, as the gain element is located far away from the cavity end mirrors compared to the thickness of the gain element. This is beneficial to get transform-limited pulses.

In one specific embodiment, we choose the first curved mirror 322, i.e. the high reflecting mirror, to have a radius of curvature of 4.1 mm, and the second curved mirror 324 to have a radius of curvature of 5 mm with a reflectivity of 99.5% at the laser wavelength. The distance between the Er:Yb:glass 2 and the first curved mirror 322 is approximately 5.2 mm, the distance between the Er:Yb:glass 2 and the curved output coupler is approximately 4.8 mm, and the distance from the first curved mirror 322 to the semiconductor saturable absorber device 4 is approximately 3.2 mm. This gives a nominal total cavity length of approximately 15.0 mm (taken into account the effective length of the laser gain element 2, i.e., its index of refraction of n=1.521 times its physical length along the optical path of 1.2 mm), which corresponds to a nominal free spectral range (i.e., laser repetition rate) of 10 GHz. In this configuration, the mode radius in the gain medium is 24 $\mu$m in the tangential plane and 18 $\mu$m in the sagittal plane. On the semiconductor saturable absorber device, they are 10 $\mu$m and 10 $\mu$m, respectively.

Of course, the expert in the field will know many other solid state or other (semiconductor etc.) gain media and many other cavity designs for constructing a laser according to the invention. An other preferred example of a gain medium, next to the gain media described in the mentioned US patent application, is Nd:Vanadate, Nd:YAG, Nd:YLF, Yb:YAG, Yb:KWG, Nd:glass and many others.

Because the semiconductor saturable absorber device according to the invention and the laser according to the invention solve many problems, which are encountered when going to high repetition frequencies above 1 GHz, maybe above 9 GHz or even of 40 GHz or higher at the (future) telecommunication vacuum wavelengths around 1550 nm, according to one preferred embodiment, the absorber device according to the invention is used in a laser for providing light pulses in an optical fiber communiction system. However, the expert will know an arbitrary number of further applications the outstanding properties of the device and the laser according to the invention may be used for.

As already mentioned, although all examples described above refer to an optical frequency corresponding to a vacuum wavelength around 1550 nm (a probable standard for fiber optics communication systems within the coming years), adaptations for other optical frequencies are straightforward for the expert. One possible other telecommunication wavelength is range is around 1300 nm. Also further wavelengths are accessible with the invention. As a further example for illustration purposes, when modifying the devices to be suited for a wavelength of 1064 nm, the layer thicknesses given in the above described examples, except the absorber and passivating layer thickness, have to be multiplied by approximately 1064/1550≈0.69. The absorber layer composition changes to $In_xGa_{1-x}As$ with x≈0.25 etc.

Further possible modifications of the described embodiments, which modifications are within the scope of the invention, concern the Bragg reflector. Instead of GaAs/AlAs pairs, other mirror pairs may be used. Examples comprise $(Al_{0.15}Ga_{0.85})_{0.48}In_{0.52}As/Al_{0.48}In_{0.52}As$, $(Al_{0.15}Ga_{0.85})_{0.48}In_{0.52}As/InP$ $In_{0.65}Ga_{0.35}As_{0.73}P_{0.27}/InP$ and others. A further interesting class of compounds for being used in a device according to the invention are the InGaAs-Nitrides (InGaAsN). Adding Nitrogen to GaAs/InGaAs reduces the lattice mismatch, so that the InGaAsN absorber layer has less lattice mismatch compared to the GaAs/AlAs Bragg mirror.

Numerous other embodiments may be envisaged, without departing from the spirit and scope of the invention.

What is claimed is:

1. A semiconductor saturable absorber device for reflecting at least a proportion of electromagnetic radiation of essentially one given optical frequency impinging on said device, comprising
   a substrate,
   a first layered structure comprising a stack of layers placed on said substrate, said stack comprising alternating layers of a first material having a first index of refraction and of a second material having a second index of refraction, said first and said second indices of refraction being different from each other, said stack forming a Bragg reflector for radiation of said optical frequency,
   a second layered structure placed adjacent to said first layered structure and comprising at least one layer with semiconductor material having a nonlinear optical absorption at said given optical frequency,
   and a dielectric coating layer placed on an outermost surface of said second layered structure, such that an interface is formed between said second layered structure and said dielectric coating layer, an index of refraction of said dielectric coating layer being lower than said first index of refraction and said second index of refraction,
   wherein said stack of layers, said second lay red structure and said dielectric coating layer cooperate such that the field intensity of radiation of said given optical frequency is at a maximum at or near said interface between said second layered structure and said dielectric coating layer.

2. The device of claim 1, wherein the thickness of said dielectric coating layer corresponds to at least a quarter of a wavelength of said radiation in the dielectric material of said dielectric coating layer.

3. The device of claim 2 wherein said dielectric layer has a thickness of about $(2n+1)/4$ times the wavelength of said radiation in said dielectric layer, where $n \geq 0$ = any whole number.

4. The device of claim 1 wherein said dielectric layer has a thickness of more than 10 nm and less than a quarter of a wavelength of said radiation in said dielectric layer.

5. The device of claim 1, said dielectric layer has a thickness of more than a quarter of a wavelength of said radiation in said dielectric layer.

6. The device of claim 1 wherein said at least one layer with semiconductor material having a nonlinear optical absorption is placed at the interface between said structure and said dielectric coating layer.

7. The device of claim 1, wherein said second layered structure comprises a spacer layer, said layer with semiconductor material having a nonlinear optical absorption at said frequency being placed adjacent to said spacer layer, and a cap layer of semiconductor material placed adjacent to said layer with semiconductor material having a nonlinear optical absorption, wherein said dielectric coating layer is placed adjacent to said cap layer, wherein said cap layer has a thickness of 20 nm or less, and wherein said field intensity of radiation of said given frequency takes up a maximum at the position of said layer with semiconductor material having a nonlinear optical absorption at said frequency.

8. The device of claim 1, wherein said semiconductor layer with a nonlinear optical absorption is epitaxially grown onto a GaAs or AlAs spacer layer.

9. The device of claim 8, wherein said semiconductor layer with a nonlinear optical absorption has a thickness such that it is strained and not relaxed.

10. The device of claim 1, wherein said semiconductor layer with a nonlinear optical absorption has a thickness exceeding the relaxation thickness.

11. The device of claim 1, wherein said optical frequency is $\nu = c/\lambda$ with 1525 nm $< \lambda <$ 1575 nm.

12. The device of claim 11, wherein said semiconductor layer with a nonlinear optical absorption is essentially an $In_xGa_{1-x}As$ layer with $0.49 < x < 0.58$.

13. The device of claim 12, wherein said Bragg reflector comprises a stack of GaAs/AlAs pairs.

14. The device of claim 1, wherein said optical frequency is $\nu = c/\lambda$ with 1300 nm $< \lambda <$ 1350 nm.

15. The device of claim 1, wherein said Bragg reflector comprises a stack of GaAs/AlAs pairs, wherein said optical frequency is $\nu = c/\lambda$ with 1300 nm $< \lambda$, and wherein said semiconductor layer with a nonlinear optical absorption is essentially an $In_xGa_{1-x}As$ layer with $0.35 < x$.

16. The device of claim 1, wherein said Bragg reflector comprises a stack of GaAs/AlAs pairs, wherein said optical frequency is $\nu = c/\lambda$ with 1064 nm $< \lambda$, and wherein said semiconductor layer with a nonlinear optical absorption is essentially an $In_xGa_{1-x}As$ layer with $0.23 < x$.

17. The device of claim 1, wherein said dielectric layer is a $TiO_2$ layer, a $Si_3N_4$ (silicon nitride) layer, an $Al_2O_3$ layer, a Si (silicon) layer or a $SiO_x$ (silicon oxide) layer with $1 \leq x \leq 2$ or with $0 < x < 1$.

18. The device of claim 1, comprising only one semiconductor layer with a nonlinear optical absorption, said layer having a thickness of 10 nm or less.

19. A semiconductor saturable absorber device for serving as means for implementing passive mode-locking in an optical resonator device by saturably absorbing a proportion of electromagnetic radiation of a given optical frequency comprising
   a first layered structure comprising a stack of layers placed on said substrate, said stack comprising alternating layers of a first material having a first index of refraction and of a second material having a second index of refraction, said first and said second indices of refraction being different from each other, said stack forming a Bragg reflector for radiation of said optical frequency,
   a second layered structure placed adjacent to said first levered structure and comprising at least one layer with semiconductor material, and
   a dielectric coating layer placed adjacent to said second layered structure, said dielectric coating layer having an index of refraction which is lower than the index of refraction of the layers of said first layered structure, and
   wherein said semiconductor layer has a nonlinear optical absorption and is disposed at the interface to said dielectric coating layer, and
   wherein said first and second layered structures and said dielectric coating layer cooperate such that the field intensity of radiation of said given optical frequency in the device has a peak at said interface.

20. The device of claim 19 wherein said optical frequency is $\nu = c/\lambda$ with 1525 nm $< \lambda <$ 1575 nm.

21. The device of claim 19 wherein said optical frequency is $\nu = c/\lambda$ with 1300 nm $< \lambda <$ 1350 nm.

22. The device of claim 19, wherein the thickness of said dielectric coating layer is such that the electric field at the dielectric coating layer/air interface is at a local minimum, and wherein said dielectric layer has a thickness of about $(2n+1)/4$ times the wavelength of said radiation in said dielectric layer, where $n \geq 0$ = any whole number.

23. A semiconductor saturable absorber device for reflecting at least a proportion of electromagnetic radiation of essentially one given optical frequency impinging on said d vice, comprising
- a substrate,
- a first layered structure comprising
  - a stack of layers placed on said substrate, said stack comprising alternately layers of a first material having first index of refraction and of layers of a second material having a second index of refraction, said first and said second indices of refraction being different from each other, said stack forming a Bragg reflector for radiation of said optical frequency,
  - a second layered structure comprising at least one layer with semiconductor material having a nonlinear optical absorption at said optical frequency, and
  - a dielectric coating layer placed on an outermost surface of said second layered structure, the index of refraction of said dielectric coating layer being lower than the lower of said first index of refraction and said second index of refraction,
- wherein said stack of layers, said second layered structure and said dielectric coating layer cooperate such that the field intensity of radiation of said given frequency takes up a minimum at the surface of said dielectric coating layer.

24. A semiconductor saturable absorber device for reflecting at least a proportion of electromagnetic radiation of essentially one given optical frequency $\nu=c/\lambda$ with 1525 nm$<\lambda<$1575 nm impinging on said device, comprising
- a substrate,
- a first layered structure comprising a stack of layers placed on said substrate, said stack comprising alternating layers of a first material having a first index of refraction and of a second material having a second index of refraction, said first and said second indices of refraction being different from each other, said stack forming a Bragg reflector for radiation of said optical frequency,
- a second layered structure comprising at least one layer with semiconductor material having a nonlinear optical absorption at said optical frequency, and
- a dielectric coating layer placed on said outermost surface of said second layered structure, the index of refraction of said dielectric coating layer being lower than the lower of said first index of refraction and said second index of refraction,
- wherein said stack of layers, said layered structure and said dielectric coating layer cooperate such that the field intensity of radiation of said given frequency at a position of said semiconductor material having a nonlinear optical absorption is enhanced compared to an alternative device comprising said substrate, said stack of quarter-wave layers, and said layered structure but in which alternative device said dielectric coating layer is replaced by semiconductor material.

25. A semiconductor saturable absorber device for reflecting at least a proportion of electromagnetic radiation of essentially one given optical frequency $\nu=c/\lambda$ with 1300 nm$<\lambda<$1350 nm impinging on said device, comprising
- a substrate, a first layered structure comprising a stack of layers placed on said substrate, said stack comprising alternating layers of a first material having a first index of refraction and of second material having a second index of refraction, said first and said second indices of refraction being different from each other, said stack forming a Bragg reflector for radiation of said optical frequency,
- a second layered structure comprising at least one layer with semiconductor material having a nonlinear optical absorption at said frequency, and
- a dielectric coating layer placed on said outermost surface of said second layered structure, the index of refraction of said dielectric coating layer being lower than the lower of said first index of refraction and said second index of refraction,
- wherein said stack of layers, said second layered structure and said dielectric coating layer cooperate such that the field intensity of radiation of said given frequency at a position of said semiconductor material having a nonlinear optical absorption is enhanced compared to an alternative device which comprises said substrate, said stack of quarter-wave layers, and said second layered structure but in which alternative said dielectric coating layer is replaced by semiconductor material.

26. A laser for emitting a continuous-wave train of electromagnetic-radiation pulses characterized by an effective optical frequency, comprising:
- an optical resonator,
- a laser gain element placed inside said optical resonator,
- pumping means for exciting said laser gain element to emit electromagnetic radiation of said effective frequency, and
- mode-locking means for passive mode-locking optical radiation of said optical frequency circulating in said optical resonator comprising
  - a substrate,
  - a first layered structure comprising a stack of layers placed on said substrate, said stack comprising alternating layers of a first material having a first index of refraction and of a second material having a second index of refraction, said first and said second indices of refraction being different from each other, said stack forming a Bragg reflector for radiation of said optical frequency,
  - a second layered structure comprising at least one layer with semiconductor material having a nonlinear optical absorption at said frequency, and
  - a dielectric coating layer placed on an outermost surface of said second layered structure, the index of refraction of said dielectric coating layer being lower than the lower of said first index of refraction and said second index of refraction, said second layered structure and said dielectric coating layer cooperating such that the intensity of radiation of said given optical frequency takes up a maximum at or near the interface between said second layered structure and said dielectric coating layer.

27. The laser of claim 26, wherein said optical frequency is $\nu=c/\lambda$ with 1525 nm$<\lambda<$1575 nm.

28. The laser of claim 26, wherein said optical frequency is $\nu=c/\lambda$ with 1300 nm$<\lambda<$1350 nm.

29. A laser for emitting a continuous-wave train of electromagnetic-radiation pulses characterized by an effective optical frequency $\nu=c/\lambda$ with 1525 nm$<\lambda<$1575 nm, comprising:
- an optical resonator,
- a laser gain element placed inside said optical resonator, pumping means for exciting said laser gain element to emit electromagnetic radiation of said effective frequency, and mode-locking means for passive mode-locking radiation of said optical frequency circulating in said optical resonator comprising a substrate,
    a first layered structure comprising a stack of layers placed on said substrate, said stack comprising alternating layers of a first material having a first index of refraction and of a second material having a second index of refraction, said first and said second indices of refraction being different from each other, said stack forming a Bragg reflector for radiation of said optical frequency, a second layered structure comprising at least one layer with semiconductor material having a nonlinear optical absorption at said frequency, and a dielectric coating layer placed on said outermost surface of said second layered structure, the index of refraction of said dielectric coating layer being lower than the lower of said first index of refraction and said second indices of refraction.

* * * * *